(12) United States Patent
Allan

(10) Patent No.: US 7,455,777 B2
(45) Date of Patent: Nov. 25, 2008

(54) METHOD OF ADJUSTING LEVELS OF DISSOLVED COMPOUNDS IN BEVERAGES

(75) Inventor: Peter Allan, Santa Rosa, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 516 days.

(21) Appl. No.: 11/012,848

(22) Filed: Dec. 14, 2004

(65) Prior Publication Data

US 2006/0124547 A1 Jun. 15, 2006

(51) Int. Cl.
  B01D 61/00 (2006.01)
  A23L 2/00 (2006.01)
  A23L 1/04 (2006.01)
  A61M 1/16 (2006.01)

(52) U.S. Cl. .............. 210/652; 210/650; 210/651; 210/653; 210/195.2; 210/257.2; 426/599; 426/479; 426/333.3

(58) Field of Classification Search ......... 210/650–652, 210/195.2, 257.2; 426/11–15, 29, 431–433, 426/490, 499, 478–479, 330.1, 330.3, 330.4, 426/339.5, 599, 615, 616
See application file for complete search history.

(56) References Cited

U.S. PATENT DOCUMENTS

| | | | |
|---|---|---|---|
| 4,205,092 A | 5/1980 | Mattick et al. | |
| 4,322,446 A | 3/1982 | Heess et al. | |
| 4,560,565 A | 12/1985 | Wucherpfennig et al. | |
| 4,792,402 A | 12/1988 | Fricker | |
| 4,806,366 A * | 2/1989 | Dick et al. | 426/15 |
| 4,834,998 A * | 5/1989 | Shrikhande | 426/330.4 |
| 4,936,962 A | 6/1990 | Hatzidimitriu | |
| 5,057,197 A * | 10/1991 | Perry et al. | 210/652 |
| 5,096,590 A * | 3/1992 | Watanabe et al. | 210/644 |
| 5,204,001 A * | 4/1993 | Tonelli et al. | 210/608 |
| 5,281,430 A | 1/1994 | Herron et al. | |
| 5,403,604 A * | 4/1995 | Black et al. | 426/330.5 |
| 5,480,665 A | 1/1996 | Smith | |
| 5,496,577 A * | 3/1996 | Gresch | 426/330.5 |
| 5,510,125 A * | 4/1996 | Gresch | 426/11 |
| 5,639,493 A * | 6/1997 | Tripp et al. | 426/12 |
| 6,080,317 A * | 6/2000 | Wagner et al. | 210/652 |
| 6,554,577 B2 * | 4/2003 | Park et al. | 417/44.1 |
| 6,652,761 B2 * | 11/2003 | Martin | 210/805 |
| 6,733,813 B2 * | 5/2004 | Mantius et al. | 426/599 |

(Continued)

*Primary Examiner*—Ana M Fortuna
(74) *Attorney, Agent, or Firm*—RatnerPrestia

(57) ABSTRACT

A method of producing multiple beverage products from a solution is presented. The method comprises providing the solution in a first container, with the solution having a concentration of a dissolved component. A portion of the solution is provided to a second container, and the portion of the solution in the second container is separated into a permeate and a retentate. The permeate has a lower concentration of the dissolved component and the retentate has a higher concentration of the dissolved component. The permeate is fed back into the first container to form a mixture of solution and permeate in the first container. A portion of the mixture is circulated with a portion of the retentate in the second container, forming a combination. The combination is then separated. The process may be repeated with the permeate from the combination separation being fed back to the first container, while the retentate from the separation of the combination is fed back into the second container.

15 Claims, 2 Drawing Sheets

U.S. PATENT DOCUMENTS

| | | |
|---|---|---|
| 6,927,048 B2 * | 8/2005 | Verser et al. ................ 435/161 |
| 2001/0031293 A1 | 10/2001 | Ferrarini |
| 2003/0075506 A1 | 4/2003 | Tudhope |
| 2003/0106850 A1 | 6/2003 | Arnaut et al. |
| 2003/0235640 A1 | 12/2003 | Ferrarini |
| 2004/0067280 A1 | 4/2004 | Bonnet et al. |

* cited by examiner

METHOD OF ADJUSTING LEVELS OF DISSOLVED COMPOUNDS IN BEVERAGES

BACKGROUND OF THE INVENTION

Beverages may naturally contain dissolved compounds that are higher or lower in concentration than is desirable for a beverage product. The methods available for reducing the level of dissolved compounds typically remove the excess dissolved compounds in a form that is easily disposed. Thus these methods result in a reduction of the level of dissolved compounds in the production of a single beverage product, and the disposal of any excess dissolved compounds. Such methods include ion exchange, electrodialysis, evaporation, distillations, fining agents, such as bentonite and gelatin, chilling or freezing.

U.S. Pat. No. 5,480,665 issued to Smith (incorporated herein by reference) is directed to a method of removing compounds from a solution by using reverse osmosis techniques that employ a membrane specific to particular substances such as ethyl acetate and acetic acid. The substances are classed together as volatile acidity compounds. The membrane retains the specific substances, providing a permeate with a reduced concentration of the specific substances.

The preparation of wines and other beverage products can include filtration to remove or reduce undesired components. Typically, the portion of the beverage that is retained from passing through the filter is discarded, and the filtered portion, or permeate is used in forming the final beverage product. It is desirable in some cases to produce beverages that have lower concentrations of a dissolved compound while retaining the excess dissolved compounds in a beverage form for use in different beverage products.

While filtration is commonly used to reduce some undesired components, enzyme digestion is used to reduce carbohydrate content in alcoholic beverages, such as beer. Enzyme digestion has been unsuccessful, however, as a method for reducing carbohydrates in wine.

SUMMARY OF THE INVENTION

A method of producing multiple beverage products from a solution is presented. The method comprises providing the solution in a first container, with the solution having a concentration of a dissolved component. A portion of the solution is provided to a second container, and the portion of the solution in the second container is separated into a permeate and a retentate.

The permeate has a lower concentration of the dissolved component and the retentate has a higher concentration of the dissolved component. The permeate is fed back into the first container to form a mixture of solution and permeate in the first container. A portion of the mixture is circulated with a portion of the retentate in the second container, forming a combination. The combination is then separated. The process may be repeated with the permeate from the combination separation being fed back to the first container, while the retentate from the separation of the combination is fed back into the second container.

DETAILED DESCRIPTION OF THE INVENTION

A process for producing beverage products is presented. The process includes filtering a solution, such as wine or juice, through a membrane to create a permeate and a retentate. The permeate having passed through the filter, contains a lower concentration of particular dissolved components than does the starting solution. The retentate does not pass through the filter, and thus contains a comparatively higher concentration of the particular dissolved components.

The invention will next be described with reference to the figures in which same numbers indicate same parts in all figures. The figures are provided to facilitate the description of the invention and are not exact representations to scale of the different elements depicted nor do they show additional elements that are not essential in describing the present invention.

Figure 1:
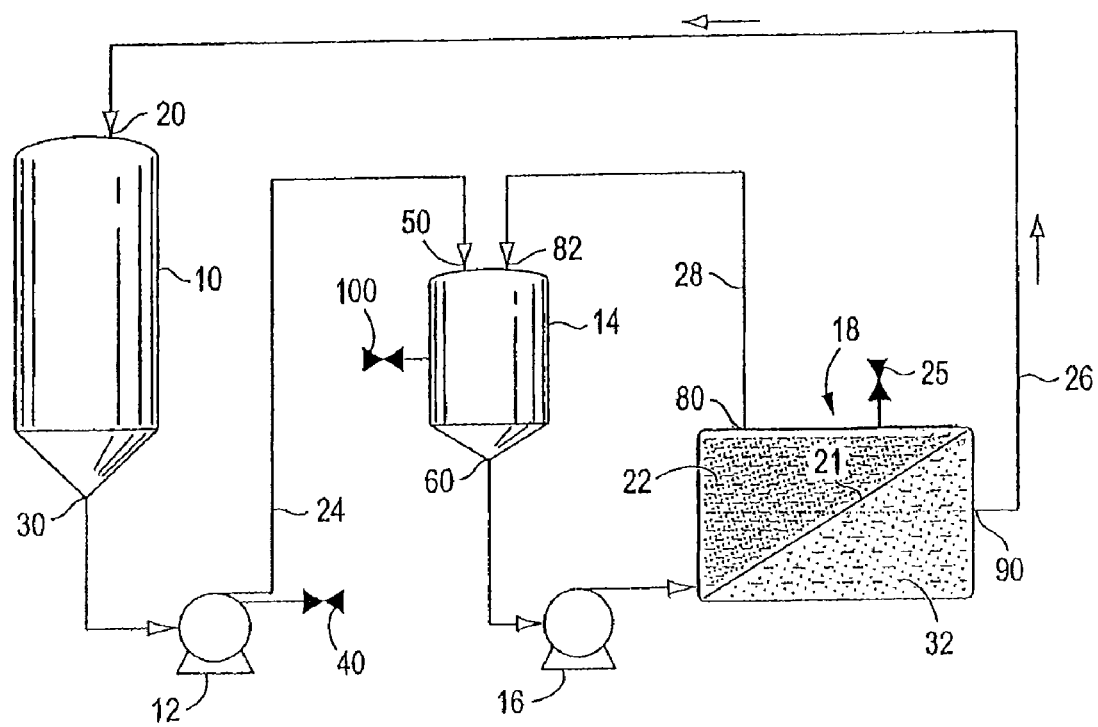
FIG. 1 is a schematic of an exemplary system for operating the processes of the invention.

FIG. 1 is a schematic of a system that may be used to carry out the invention. In one embodiment of the invention, a starting solution is stored in a storage tank 10 with an inlet 20 and an outlet 30. A pump 12 is attached to the outlet 30 and can send the contents of the storage tank to a tap 40 or to a pipe 24 connected to a feed tank 14. The pipe 24 connects to the feed tank 14 at an inlet 50. The contents of the storage tank are fed into the feed tank 14 through the inlet 50. The contents of the feed tank are transferred through an outlet 60 by a pump 16 into a filtration system 18.

The filtrations system 18 contains a filtration membrane 21. The filtration system separates the solution from the feed tank to form a retentate 22 and a permeate 32. The permeate 32 is transferred through a filtration system outlet 90 to a pipe 26 connected to the storage tank inlet 20. The retentate is transferred through another filtrations system outlet 80 to pipe 28 connected to another feed take inlet 82. A portion of retentate from filtration system 18 may also be recovered as product via tap 25.

The process continues by providing the contents of the storage tank 10, which contains a mixture of starting solution and permeate, to the feed tank 14, which contains a mixture of storage tank contents and retentate, and pumping the contents of the feed tank 14 through the filtration system.

Ultimately, beverage products are collected from the storage tank through tap 40, and from the feed tank through tap 100. The storage tank beverage product contains a lower concentration in a particular dissolved component than does the starting material and the beverage product from the feed tank.

Figure 2:
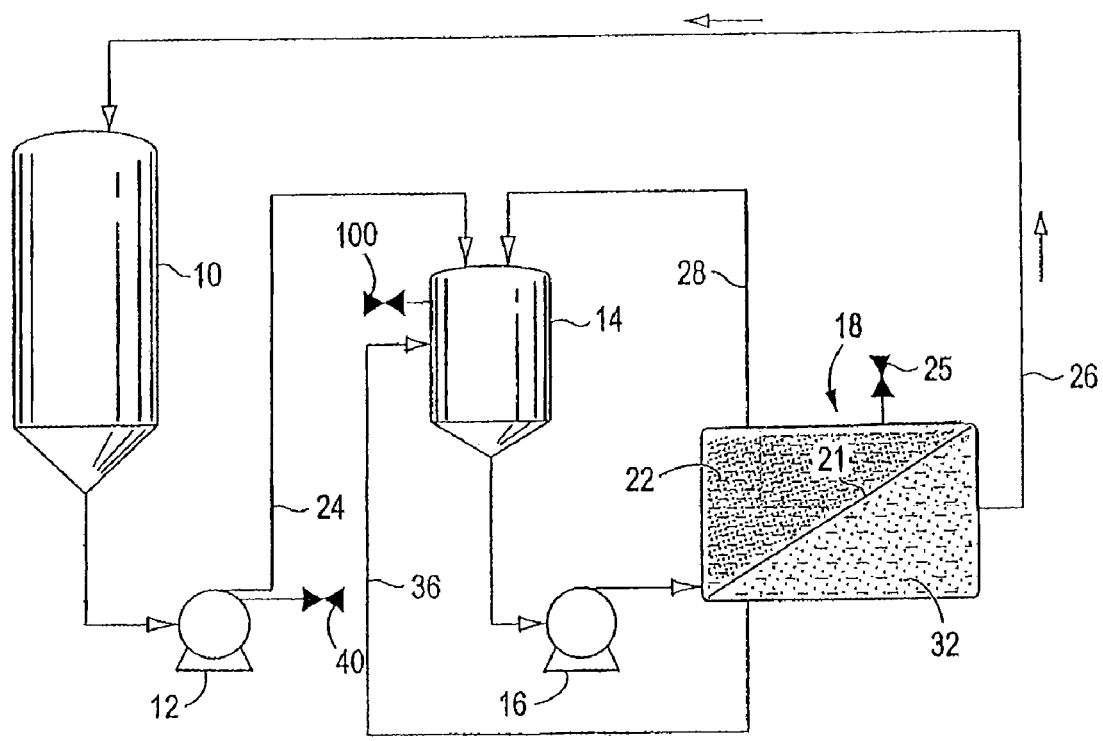
FIG. 2 is a schematic of another exemplary system for operating the processes of the invention.

FIG. 2 provides another exemplary system for carrying out the process of the present invention. In FIG. 2, the system has a pipe 36 which is used to feed permeate 20 from the filtration system 18 to the feed tank 14 directly. Although not shown in the figure, the permeate is driven to the feed tank with a pump, or other device. This option allows for optimizing the dissolved component content in the feed tank without feeding from the storage tank, or upsetting the dissolved component content level of the contents of the storage tank. In practice, this option is appropriate when the material in the storage tank has a desired concentration of the dissolved component, yet the contents of the feed tank require additional adjustment to the level of dissolved component present.

Figure 3:
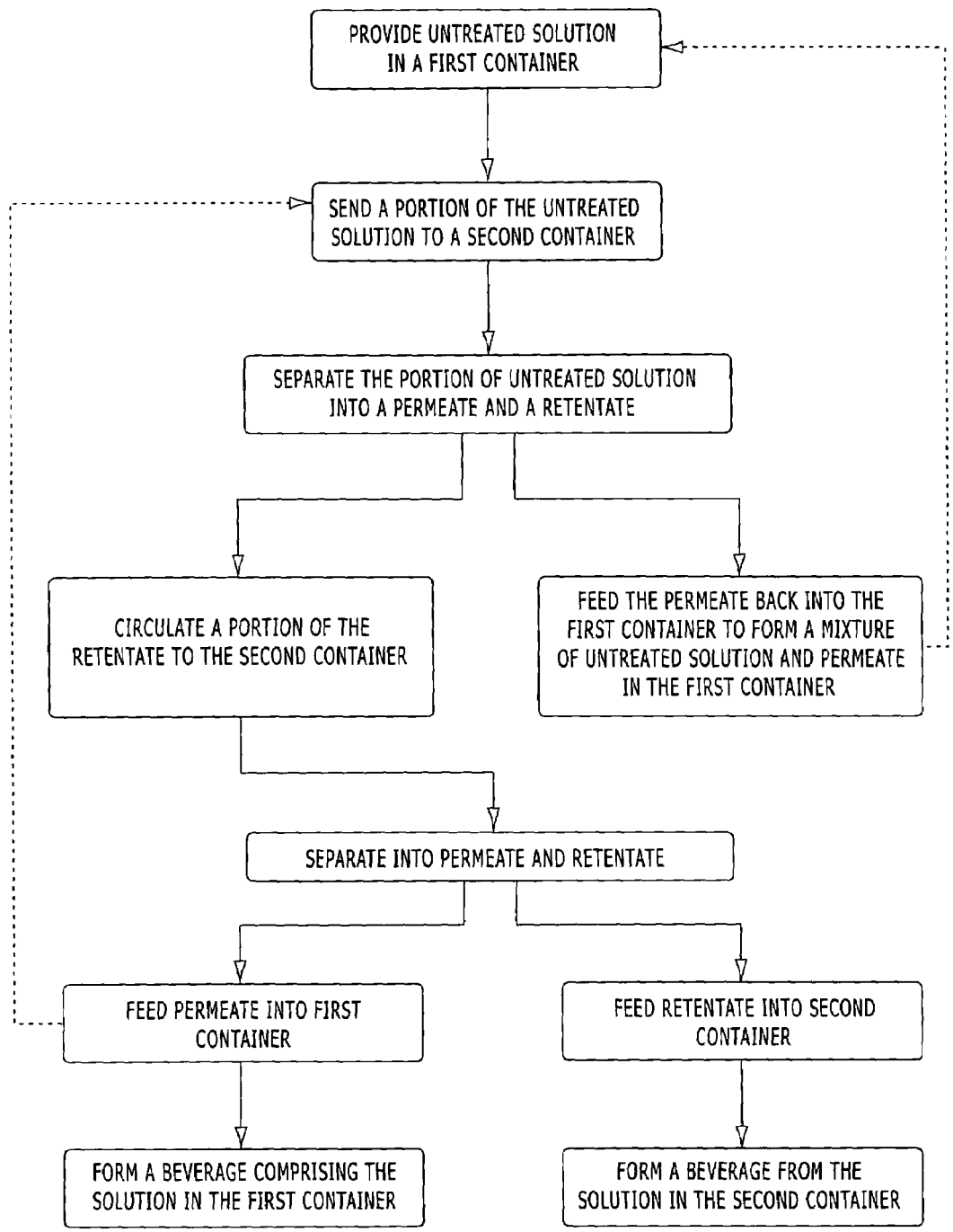
FIG. 3 is a flowchart showing the steps of an exemplary embodiment of the invention.

FIG. 3 is a flow chart illustrating the steps of a process according to the invention. Initially, an untreated solution, such as wine or juice, is stored in a first container, such as a storage tank. A portion of the untreated solution is transported into a second container, such as a feed tank, and from the second container, the solution is fed into a filtration unit which separates the solution into a permeate and a retentate. The permeate is fed back into the first container, while the retentate is circulated back to the second container. Material from the first container is fed into the second container, and the contents of the second container are fed to the filtration unit and separated into permeate and retentate. The permeate is again fed back into the first container, while the retentate is fed back into the second container.

This process may be iterative, with multiple cycles of filtration being performed. The process may also be continuous with a continual flow of solution through the filtration device with the permeate and the retentate transported to the first container and the second container respectively.

When either one or both of the solutions in the first and second containers have reached a desired concentration of a dissolved component, the beverage products are formed from the solutions in the respective containers. The concentration of dissolved components may be determined by a variety of known methods in the art, including sampling, monitoring devices, etc.

As discussed above, the invention includes a method of producing multiple beverage products from a solution. The method comprises providing the solution in a first container, such as a storage container. In a commercial application, the first container may contain 100,000 gallons or more of the starting solution. The starting solution may have various concentrations of dissolved components. The dissolved components include acidity, carbohydrates or sugars, phenolic compounds, such as tannins, alcohol, and if the solution is grape based, tartrates.

The concentration of the dissolved components are adjusted by filtering out the dissolved components from one part of the beverage, and adding the filtered dissolved components into a separate portion of the beverage solution.

Once the starting solution is in the first container, a portion of the solution is transferred into a second container. From the second container, the portion of the solution is separated into a permeate and a retentate. The permeate has a lower concentration of the dissolved component and the retentate has a higher concentration of the dissolved component.

The permeate is fed back into the first container forming a mixture of solution and permeate in the first container, and a portion of this mixture is circulated with a portion of the retentate in the second container. This circulation of permeate mixture with retentate forms a combination. This combination is then sent to the filtration unit and separated. The permeate may be fed directly from the filtration unit to the first container without any subsequent processing.

These steps may be repeated with the permeate from filtering the combination being fed back to the first container, while the retentate is fed back to the second container. The steps may also be repeated in a continuous fashion, such that the permeate is continuously fed back to the first container, while the retentate from the filtration unit is continuously fed back into the second container. To maintain a continuous process, the flow rates into the first and second containers may be adjusted to accommodate the speed and pressure conditions of the filtration unit, as well as to provide optimum levels of dissolved components in the beverage product stock formed in the first and second containers.

In terminating the process, a final permeate and a final retentate are formed from separating the combination. The final permeate and the final retentate may be added to the contents of the first and second containers, respectively, or alternatively, may be discarded, or used to adjust the dissolved content levels of the beverage products being produced, or other beverage products produced through other processes. The process results in forming a first beverage product comprising the mixture in the first container. This first beverage product may comprise the final permeate. Also formed is a second beverage product comprising the combination in the second container, and may contain the final retentate.

Typically, the first beverage product contains a lower concentration of the dissolved component than the starting solution, and the second beverage product contains a higher concentration of the dissolved component than the starting solution. In forming these beverage products, the concentration of the particular dissolved components in the beverage is adjusted to a pre-determined concentration. For example, starting with a wine solution, the first beverage formed may be a low carbohydrate wine that contains fewer carbohydrates than the starting wine. The second beverage formed in this example would have a higher carbohydrate concentration than the starting material.

For this example, the process is adjusted to provide wines that have the desired levels of carbohydrates for both final beverage products. The process operates until the two constraints on the system, the carbohydrate concentration desired for the low-carbohydrate wine and the carbohydrate concentration desired for the high-carbohydrate wine, are satisfied. Thus, the concentration of the dissolved component in the beverage is adjusted to a pre-determined concentration by operation of repetitive or continual cycles of the separation process.

The separation process is an integral aspect of the process for forming beverage products. In separating a portion of the solution into a permeate and a retentate, the solution is pumped through a filtration unit. While many standard filtration processes are acceptable for use in the invention, preferred filtration units include a reverse osmosis apparatus, a nanofiltration apparatus, a direct osmosis apparatus, a microfiltration apparatus, and an ultrafiltration apparatus, with a reverse osmosis apparatus and a nanofiltration apparatus being particularly preferred. Reverse osmosis or nanofiltration membranes may be used in any of their commercial forms, including spiral wound, tubular, flat sheet, and hollow fiber membranes, as a part of any commercial system.

As described above, the first beverage is processed in the first container. In another embodiment or the process, the first container may be processed in a third container. In this variation, the first container would continue to supply a starting solution to the second container, but the permeate would be used in processing a beverage in a separate container. The retentate, however, may still be fed back into the second container.

Also included in the invention are the beverage products formed by the invention, particularly low-carbohydrate wines. While several "low-carb" beer products are available, the enzyme-based process of reducing the carbohydrate levels in beer have not proven effective in reducing carbohydrates in wine. Accordingly, the present invention provides a process for reducing and increasing the levels of dissolved components, which have not previously been adjusted for wines in a commercial application. In producing a wine with reduced carbohydrates, it is advantageous to simultaneously produce a second wine variation high in carbohydrates. The present invention also provides other alcoholic beverages, such as beer, in addition to non-alcoholic beverages, such as fruit juice.

The invention further includes a system for processing a beverage product. The system comprises a storage tank, a feed tank, and a filtration system. The system has means for transferring fluid from the storage tank to the feed tank, as well as means for transferring fluid from the feed tank to the filtration system. These means can include a pump connected to a transfer pipe between the components. The filtration system also comprises a permeate section and a retentate section separated by a filter. The filter separates the fluid into two solutions, a permeate and a retentate, therefore in addition to an inlet for receiving the fluid, the filtration system has two outlets, a first outlet adapted to transfer permeate from the permeate section of the filtration system to the storage tank, and a second outlet adapted to transfer a retentate from the retentate section to the feed tank. The inlet is adapted to receive fluid from the feed tank. The filtration system may be selected from standard filtration systems, for example, a reverse osmosis filtration system or a nanofiltration system.

EXAMPLES

Example 1

Carbohydrate Reduction in Wine

The original wine in a storage container is fed to a smaller feed tank to a nanofiltration or reverse osmosis filtration system. The permeate from the filtration system is sent back to the storage tank, diluting the carbohydrates and gradually reducing the content of carbohydrates in the wine in the storage container. Simultaneously, the retentate from the filtration system returns to the feed tank, increasing the concentration of carbohydrates in the feed tank.

The process is stopped when either the original wine storage tank has reached the desired reduction of carbohydrates, and/or the small feed tank has reached its desired or maximum concentration of carbohydrates.

Example 2

Tartrate Reduction in Wine to Achieve Cold Stability

Dissolved tartrates in grape juice become super-saturated when juice becomes wine, due to tartrates lower solubility in alcohol. This super-saturation of tartrates must be reduced before bottling or the tartrates will precipitate in the bottle, making an unattractive sediment for consumers. Typically, wine solutions are chilled for weeks at near freezing temperatures to promote tartrate precipitation prior to bottling. It is energy expensive to maintain the cold temperatures for large volumes of wine while the tartrates precipitate out of solution and collect in the chilled storage tank.

It is possible to concentrate the dissolved tartrate level in wine to a higher concentration in super-saturation in order to initiate precipitation. Nanofiltration or reverse osmosis filtration may be used to concentrate the tartrate level to a higher concentration in supersaturation, but the permeate from this filtration process may not be stored separately, or it will not be able to be sold as wine, or a wine component.

According to one embodiment of the invention, the original wine, which is super-saturated in tartrates, is stored in a storage tank fed into a feed tank. The wine is sent through a filtration system and the permeate is sent back to the storage tank, effectively reducing the tartrate levels of the original wine. This may continue until the wine in the storage tank has tartrate levels less than the saturation point in wine.

Simultaneously, the retentate from the filtration system is fed back to the feed tank so that the concentration of the wine in the feed tank has increasing levels of tartrates, while more original wine is added from the storage tank to replace the volume removed as permeate. Eventually, the level of dissolved tartrates becomes so high in the feed tank that the tartrates begin to precipitate. With precipitation, the level of dissolved tartrates drops supersaturated to saturation, where no further precipitation can occur. After precipitation has occurred, the wine in the feed tank can be decanted or filtered off the tartrate sediment and used in a wine product, either with the original wine, or in a separate beverage product.

Example 3

Operation of Process in a Commercial Processing Plant

A storage tank capable of holding 100,000 gallons of wine is connected to a filtration system feed tank. The feed tank holds 95,000 gallons. A pump is used to transfer wine from the storage tank to the feed tank until the feed tank is full. The wine may be transferred directly from the storage tank to the feed tank, or the wine may be fed from the storage tank through the filtration system into the feed tank until the feed tank is full.

A second pump transfers wine from the feed tank through the filtration system, sending the retentate back to the feed tank, and the permeate back to the storage tank. In a continuous operation, the storage tank pump continues to transfer wine from the storage tank to the feed tank at the same rate as the permeate from the filtration system is transferring into the storage tank, maintaining approximately a constant volume in the storage tank.

In this example, the storage tank maintains a volume of approximately 5,000 gallons, and the filtration system retains dissolved carbohydrates, acids, and tartrates. The concentration of dissolved carbohydrates, acids, and tartrates is reduced in the storage tank, as the permeate with reduced levels of dissolved carbohydrates, acids, and tartrates is transferred into the storage tank. Simultaneously, the levels of dissolved carbohydrates, acids, and tartrates in the feed tank increases as a result of having the retentate from the filtration process fed into the feed tank.

The permeate may be sent directly to the storage tank from the filtration system, or collected in a permeate transfer tank to pump it continuously the storage tank, or permeate may be mixed with wine from the storage tank in a permeate transfer tank, and then sent to the storage tank. Some jurisdictional regulations require that the process be carried out in a facility processing distilled spirits if the permeate is stored in a separate tank for later blending with the wine in the storage tank.

When the process is terminated, the first pump stops pumping wine from the storage tank to the feed tank, wine in the filtration system is pumped into the storage tank. As the filtration system continues to separate wine with the permeate going to the storage tank, the volume of the feed tank decreases until the feed tank reaches its desired minimum level.

The wine in the feed tank can be transferred to another tank for any further processing, or blended with the wine in the storage tank, or other wines.

Example 4

Operation of Method to Reduce Carbohydrates, Acids and Phenolic Compounds in a 2003 Zinfandel Wine Using the method as described above, a 2003 Zinfandel wine in a storage tank was fed to a nanofiltration system, with the permeate continuously returned to the storage tank and the retentate continuously fed back to the feed tank. The following results were achieved:

| Dissolved Component | Wine in Storage Tank Before Processing | Wine in Storage Tank After Processing | Permeate During Processing |
|---|---|---|---|
| Carbohydrates | 2.91 g/100 ml | 2.14 g/100 ml | 0.44 g/100 ml |
| Titratable Acidity | 0.58 g/100 ml | 0.46 g/100 ml | 0.19 g/100 ml |
| Total Phenolics | 2060 mg/liter | 1600 mg/liter | 80 mg/liter |

The permeate with significantly lower dissolved components was able to continuously dilute the starting wine to lower carbohydrate, total acid and total phenolics in the same wine after processing.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method of producing multiple beverage products from a solution, the method comprising:
    a. providing the solution in a first container, the solution having a concentration of a dissolved component;
    b. providing a portion of the solution into a second container;
    c. separating the portion of the solution from the second container by a membrane into a permeate and a retentate; the permeate having a lower concentration of the dissolved component and the retentate having a higher concentration of the dissolved component;
    d. feeding substantially all of the permeate back into the first container forming a mixture of solution and permeate in the first container;
    e. feeding substantially all of the retentate back into the second container; and
    f. circulating a portion of the mixture with a portion of the retentate in the second container forming a combination and separating the combination
    g. repeating steps b, c, d, and e.

2. The method of claim 1 wherein separating the combination forms a final permeate and a final retentate, and the process further comprises:
    g. forming a beverage product comprising the mixture and the final permeate and collecting the beverage product from the first container.

3. The method of claim 2 wherein the beverage product contains a lower concentration of the dissolved component than the solution.

4. The method of claim 2 wherein the forming of the beverage product comprises adjusting the concentration of the dissolved component in the beverage to a pre-determined concentration.

5. The method of claim 1 wherein the membrane comprises a filter selected from the group consisting of a reverse osmosis apparatus, a nanofiltration apparatus, a direct osmosis apparatus, a microfiltration apparatus, and an ultrafiltration apparatus.

6. The method of claim 5 wherein the membrane unit comprises a filter selected from the group consisting of a reverse osmosis apparatus and a nanofiltration apparatus.

7. The method of claim 1 wherein the dissolved component comprises a component selected from the group consisting of acids, carbohydrates, phenolic compounds, alcohol, and tartrates.

8. The method of claim 7 wherein the dissolved component is carbohydrates.

9. A method of producing multiple beverage products from a solution, the method comprising:
    a. providing the solution in a first container, the solution having a concentration of a dissolved component;
    b. providing a portion of the solution into a second container;
    c. separating the portion of the solution from the second container by a membrane into a permeate and a retentate; the permeate having a lower concentration of the dissolved component and the retentate having a higher concentration of the dissolved component;
    d. feeding substantially all of the permeate back into the first container forming a mixture of solution and permeate in the first container;
    e. feeding substantially all of the retentate back into the second container;
    f. circulating a portion of the mixture with a portion of the retentate in the second container forming a combination and separating the combination, wherein separating the combination forms a final permeate and a final retentate, and the process further comprises:
    g. forming a first beverage product comprising the mixture and the final permeate and collecting the first beverage product from the first container; and
    h. forming a second beverage product comprising the final retentate and collecting the second beverage product from the second container.

10. The method of claim 9 wherein the first beverage product contains a lower concentration of the dissolved component than the solution, and the second beverage product contains a higher concentration of the dissolved component than the solution.

11. The method of claim 10 wherein the forming of the first beverage product comprises adjusting the concentration of the dissolved component in the beverage to a pre-determined concentration.

12. A system for processing a beverage product to produce at least two beverages of predetermined concentrations of dissolved components, the system comprising a storage tank, a feed tank and a filtration system, wherein the system has means for transferring fluid from the storage tank containing a beverage to the feed tank and means for transferring fluid from the feed tank to the filtration system, the filtration system comprising a permeate section and a retentate section separated by a membrane filter, the filtration system further comprising an inlet, a first outlet, and a second outlet, the inlet adapted to receive fluid from the feed tank, the first outlet adapted to transfer substantially all of a fluid from the permeate section to the storage tank, the second outlet adapted to transfer substantially all of a fluid from the retentate section to the feed tank; means for collecting a first beverage product from the storage tank and means for collecting a second beverage product from the feed tank.

13. The system of claim 12 wherein the filtration system is selected from the group consisting of a reverse osmosis filtration system and a nanofiltration system.

14. The system of claim 12 wherein the means for transferring fluid from the storage tank to the feed tank comprises a pump.

15. The system of claim 12 wherein the system is a closed system until the at least two beverages obtain the predetermined concentrations.

* * * * *